United States Patent
Kesterson et al.

(10) Patent No.: US 8,823,283 B2
(45) Date of Patent: Sep. 2, 2014

(54) POWER DISSIPATION MONITOR FOR CURRENT SINK FUNCTION OF POWER SWITCHING TRANSISTOR

(71) Applicant: iWatt Inc., Campbell, CA (US)

(72) Inventors: John William Kesterson, Seaside, CA (US); Richard M. Myers, Grass Valley, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 66 days.

(21) Appl. No.: 13/738,374

(22) Filed: Jan. 10, 2013

(65) Prior Publication Data

US 2013/0241427 A1   Sep. 19, 2013

Related U.S. Application Data

(60) Provisional application No. 61/610,377, filed on Mar. 13, 2012.

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ........ 315/294; 315/186; 315/209 R; 315/308; 315/309

(58) Field of Classification Search
None
See application file for complete search history.

(56) References Cited

U.S. PATENT DOCUMENTS

| 7,852,017 | B1 * | 12/2010 | Melanson | 315/291 |
|---|---|---|---|---|
| 2012/0169240 | A1 * | 7/2012 | Macfarlane | 315/152 |
| 2013/0113391 | A1 * | 5/2013 | Mercier et al. | 315/291 |

* cited by examiner

*Primary Examiner* — Anh Tran
(74) *Attorney, Agent, or Firm* — Fenwick & West LLP

(57) ABSTRACT

The embodiments disclosed herein describe a method of a power controller for monitoring for unsafe operating conditions of a drive transistor in a switching power converter of a LED lamp system by predicting the power dissipation of the drive transistor based on knowledge of the current through the drive transistor and a continuous observation of the voltage across the drive transistor. When the drive transistor approaches unsafe operating conditions, the power controller turns off the drive transistor.

20 Claims, 7 Drawing Sheets

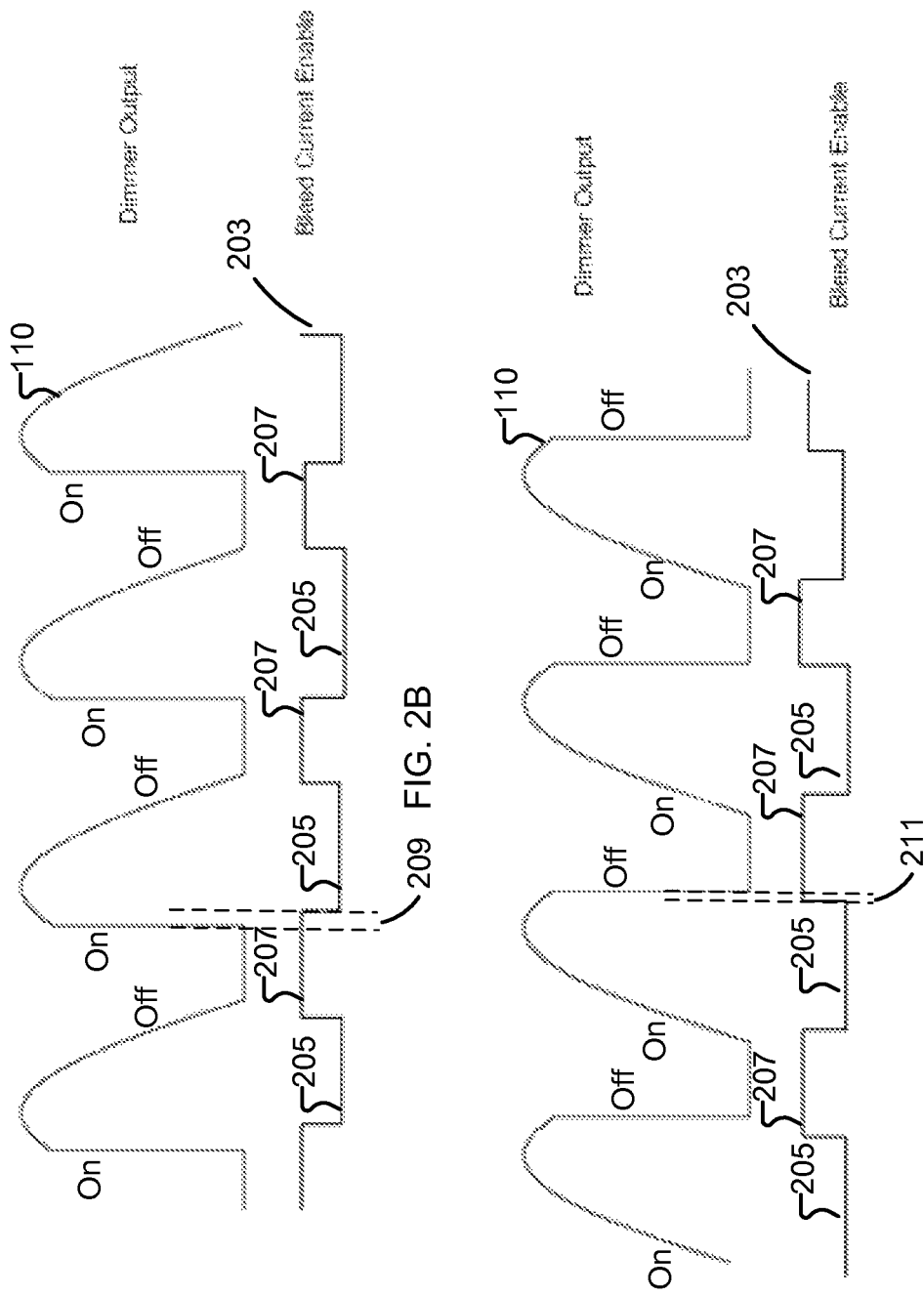

POWER DISSIPATION MONITOR FOR CURRENT SINK FUNCTION OF POWER SWITCHING TRANSISTOR

CROSS-REFERENCE TO RELATED APPLICATIONS

This application claims priority under 35 U.S.C. §119(e) from U.S. Provisional Application No. 61/610,377, filed on Mar. 13, 2012, which is incorporated by reference herein in its entirety.

BACKGROUND

1. Field of Technology

Embodiments disclosed herein relate generally to a switching power converter and more specifically to monitoring for unsafe operating conditions of a switching transistor of the switching power converter.

2. Description of the Related Arts

LED lamp systems generally include a conventional LED lamp used with a conventional dimmer switch. Conventional dimmer switches adjust lamp input voltage using a TRIAC circuit. A TRIAC is a bidirectional device that conducts current in either direction when it is triggered (i.e., turned on). Once triggered, the TRIAC continues to conduct until the current drops below a certain threshold, called a holding current threshold. For the internal timing of a TRIAC dimmer to function properly, current must be drawn from the dimmer at certain times. Unfortunately, conventional LED lamps are unable to draw current from the dimmer switch in a manner that allows the internal circuitry of the dimmer to function properly.

SUMMARY OF THE INVENTION

The embodiments disclosed herein describe a method of a power controller for monitoring for unsafe operating conditions of a switching transistor of a switching mode power converter. In one embodiment, the switching power converter may operate in a linear mode when a drive transistor such as a bipolar junction transistor (BJT) operates in the active mode. During the active mode, the BJT operates as a current sink where current is drawn to the BJT thereby drawing current from a dimmer switch of the LED lamp system. Drawing current from the dimmer switch allows the internal circuitry of the dimmer switch to function properly.

Because the BJT dissipates power during the linear mode, the temperature of the BJT rises (i.e., the BJT heats up) which may pose a danger to the switching power converter if the BJT reaches a temperature associated with unsafe operating conditions of the BJT. In one embodiment, the power controller continuously observes a digital simulation of the power dissipated by BJT during the linear mode that describes if the BJT is operated in the active mode for a period of time which would cause the BJT to reach an unsafe operating temperature. Responsive to reaching a dissipated energy threshold, the power controller may turn-off the BJT allowing the BJT to cool to a safe operating temperature.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments disclosed herein can be readily understood by considering the following detailed description in conjunction with the accompanying drawings.

FIGS. 2A, 2B, and 2C illustrates lamp input voltage waveforms and a current enable waveform of the of a drive transistor according to one embodiment.

DETAILED DESCRIPTION OF EMBODIMENTS

Figure 1:
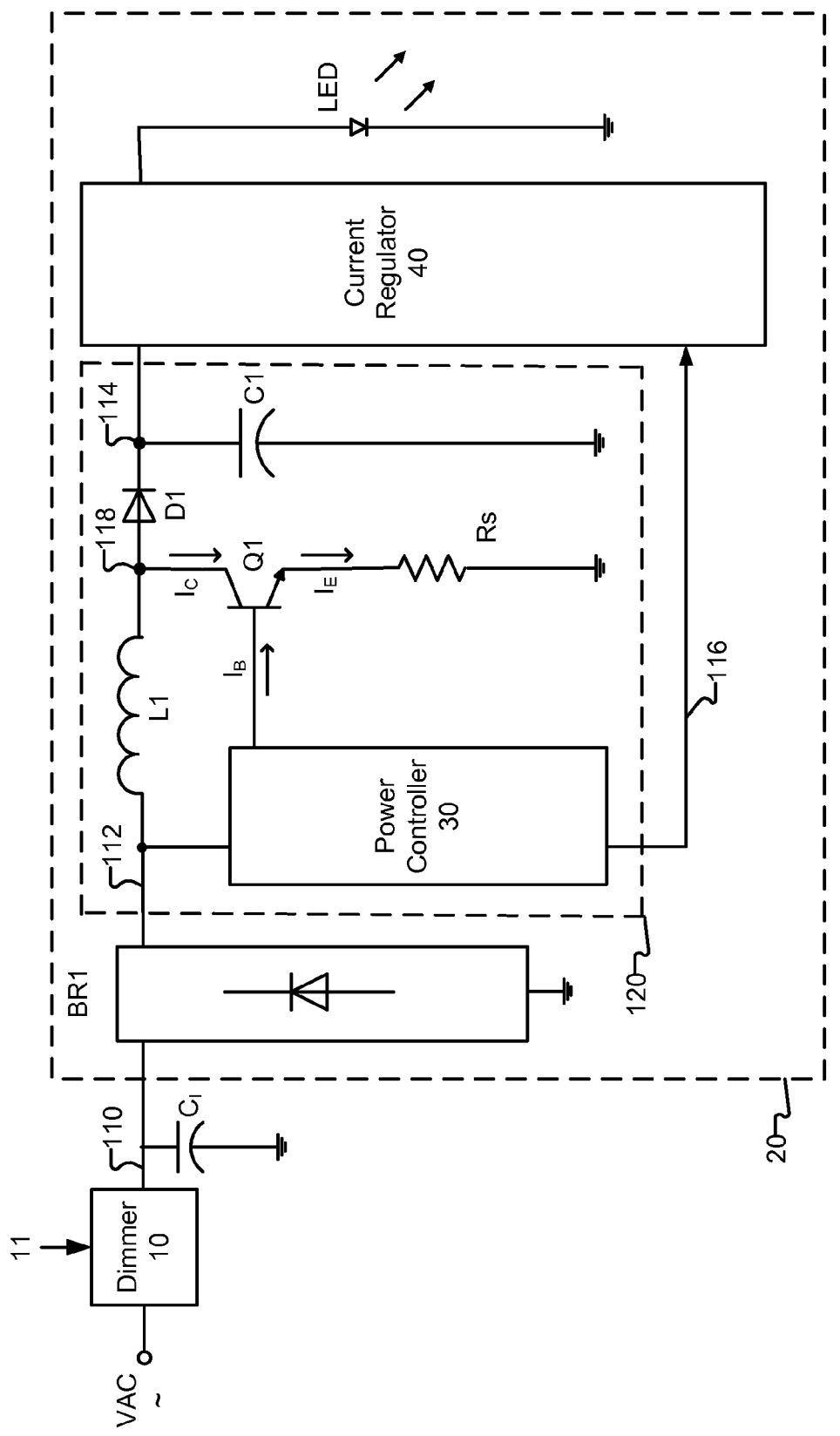
FIG. 1 illustrates a LED lamp system according to one embodiment.

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Embodiments disclosed herein describe a method of a power controller for monitoring for unsafe operating conditions of a drive transistor of a switching power converter. The power controller monitors power dissipation of the drive transistor in the switching power converter by predicting the power dissipation based on knowledge of the programmed current through the drive transistor and a continuous observation of the voltage across the drive transistor.

In one embodiment, a BJT is used as the switching device (i.e., the drive transistor) in the switching power converter of an LED lamp system. A BJT operates in different modes of operation including the cutoff mode, saturation mode, or active mode. A BJT is configured to function as an open circuit, a closed circuit, or a constant current sink based on the mode of operation of the BJT.

In one embodiment, the power controller controls the BJT to toggle between the saturation mode and the cutoff mode resulting in the BJT functioning as a switch. When the BJT operates as a switch, the switching power converter is operating in a "switching mode" according to one embodiment. During the switching mode, the switching power converter delivers electrical power to a load such as a string of LEDs. The controller further controls the BJT to operate in the active mode resulting in the BJT functioning as an adjustable current sink. During the active mode, the emitter voltage $V_E$ of the BJT is less than the base voltage $V_B$ of the BJT which is less than the collector voltage $V_C$ of the BJT (i.e., $V_E<V_B<V_C$). When the BJT operates as a current sink during the active mode, the switching power converter operates in a "linear mode" according to one embodiment.

During the linear mode, current is drawn to the BJT thereby drawing current from a dimmer switch of the LED lamp system that sets the desired light output intensity of a LED lamp. Drawing current from the dimmer switch allows the internal circuitry of the dimmer switch to function properly. Furthermore, during the linear mode, the BJT discharges input capacitors between the LED lamp and the dimmer switch to allow the internal circuitry of the dimmer switch to function properly.

During the linear mode, the BJT dissipates power due to a voltage drop occurs across the BJT and current flow through the BJT, since the BJT functions as a current sink. Because the BJT dissipates power during the linear mode, the temperature of the BJT rises (i.e., the BJT heats up) which may pose a danger to the switching power converter if the BJT reaches (or approaches) a temperature associated with unsafe operating conditions of the BJT. Generally, the power controller continuously observes a digital simulation of power dissipated by the BJT over time that describes if the BJT is operated in the active mode for a length of time which would cause the BJT to reach an unsafe operating temperature. Responsive to reaching a dissipated energy threshold, the power controller may turn-off the BJT allowing the BJT to cool to a safe operating temperature.

FIG. 1 illustrates a LED lamp system including a dimmer switch 10 and a LED lamp 20. Capacitance $C_I$ is present between the dimmer switch 10 and the LED lamp 20. In one embodiment, dimmer switch 10 is a conventional dimmer switch and receives a dimming input signal 11, which is used to set the target light output intensity of LED lamp 20. Dimmer switch 10 receives an AC input voltage signal VAC and adjusts the V-RMS value of the lamp input voltage 110 in response to dimming input signal 11. In other words, control of light intensity of LED lamp 20 by the dimmer switch 10 is achieved by adjusting the V-RMS value of the lamp input voltage 110 that is applied to LED lamp 20. Dimming input signal 11 can either be provided manually (via a knob or slider switch, not shown herein) or via an automated lighting control system (not shown herein).

One example of a dimmer switch is described in U.S. Pat. No. 7,936,132. In one embodiment, dimmer switch 10 employs phase angle switching of the lamp input voltage 110 to adjust the lamp input voltage by using a TRIAC circuit. A TRIAC is a bidirectional device that can conduct current in either direction when it is triggered. For the internal timing of a TRIAC dimmer to function properly, current must be drawn from the dimmer 10 at certain times. In one embodiment, the LED lamp 20 is configured to draw current from the dimmer 10 in a manner that allows the internal circuitry of the dimmer 10 to function properly.

The LED lamp 20 includes a bridge rectifier BR1, an inductor L1 (i.e., a magnetic element), a diode D1, a capacitor C1, the drive transistor Q1, a sense resistor Rs, a power controller 30, a current regulator 40, and a string of light emitting diodes LED. Generally speaking, the LED lamp 20 employs a boost type switching AC-DC power converter 120 comprised of inductor L1, diode D1, capacitor C1, and drive transistor Q1, using the drive transistor Q1 as the switching device driven by a dynamic switch drive signal. Drive transistor Q1 is a BJT in one embodiment, but other types of switching devices such as a metal-oxide-semiconductor field-effect transistor (MOSFET) may be used in other embodiments. Note that in other embodiments other power converter topologies may be used for the power converter such as the flyback topology.

Specifically, the bridge rectifier BR1 receives the phase-angle adjusted AC voltage 110 and generates a rectified input voltage 112. The power controller 30 receives the rectified input voltage 112 and controls the base current $I_B$ to the drive transistor Q1 coupled to the power controller 30. Generally, the power controller 30 controls the boost converter shown in FIG. 1 that performs AC-DC voltage conversion to generate the DC voltage 114.

The current regulator 40 receives the DC output voltage 114 from the power converter 120. The current regulator 40 also receives one or more control signals 116 from the power controller 30 and regulates current through the light emitting diode LED under the control of the control signals 116. Control signals 116 may include, for example, an indication of the phase-cut due to phase angle switching in the rectified input signal 112. Current regulator 40 may employ pulse-width-modulation (PWM) or constant current control to achieve the target light output intensity for the light emitting diode LED. In one embodiment, current regulator 40 is implemented as a flyback type switching power converter including a collection of components that uses a flyback topology to regulate current through the light emitting diode LED.

In one embodiment, the power controller 30 controls whether the power converter 120 is operating in the switching mode or in the linear mode based on the mode of operation of the drive transistor Q1. As described previously, the power converter 120 operates in the switching mode when the drive transistor Q1 is operated in the saturation mode, and the power converter 120 operates in the linear mode when the drive transistor Q1 is operated in the active mode. The context of the following description is described with respect to the operation of the power converter 120 in the linear mode.

Figure 2A:
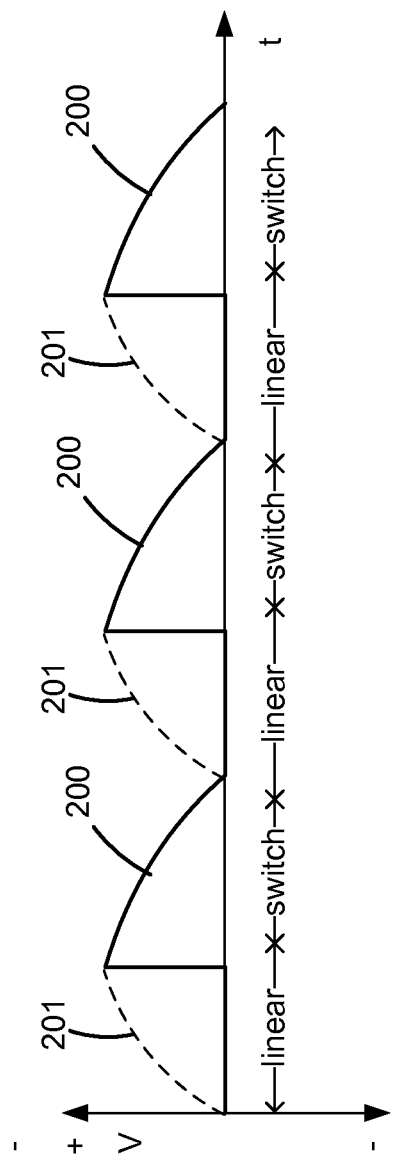

Referring to FIG. 2A, the AC voltage 110 outputted by the dimmer switch 10 into the LED lamp 20 is illustrated. Particularly, FIG. 2A illustrates the lamp input voltage with a slight dimming effect as the dimmer switch 10 eliminates, through phase angle switching, partial sections 201 of the AC voltage signal 200 inputted into the dimmer switch 10. As shown in FIG. 2A, the LED lamp system cycles between the linear mode and the switching mode previously described above. During the linear mode, the power controller 30 operates the drive transistor Q1 in its active mode by precisely controlling the base current $I_B$ to the drive transistor Q1.

As mentioned previously, during the linear mode, when the drive transistor Q1 is in the active mode, the drive transistor Q1 operates as a current sink. Accordingly, current from the dimmer 10 is drawn to the drive transistor Q1 when the power converter 120 is operated in the linear mode to allow the internal circuitry of the dimmer 10 to function properly. Furthermore, charges stored in capacitor $C_I$ between the dimmer 10 and the LED lamp 20 flows to the drive transistor Q1 thereby discharging the capacitor $C_I$. Discharging the capacitor $C_I$ also allows the internal circuitry of the dimmer switch 10 to operate properly. During the switching mode, the power controller 30 operates the drive transistor Q1 in its saturation mode by switching the drive transistor Q1 on and off.

Referring to FIG. 2B, the dimmer output voltage 110 outputted by the dimmer switch 10 and the bleed current enable 203 is illustrated according to one embodiment. The bleed current enable 203 signifies when to drive current to the base of the drive transistor Q1 to operate the drive transistor Q1 in the active mode thereby causing the drive transistor Q1 to function as a current sink. The bleed current enable 203 is an internal signal of the power controller 30. The bleed current enable 203 may have two states: an "on" state 207 that causes the power controller 30 to operate the drive transistor Q1 in the active mode and an "off" state 205 that causes the power controller 30 to turn off the drive transistor Q1.

When the drive transistor Q1 is operated in the active mode, the power controller 30 supplies a range of current magnitude to the base of the drive transistor Q1 to operate the drive transistor Q1 in the active mode. In one embodiment, the range of current magnitude supplied by the power controller 30 ranges from 0.4 mA to 28 mA. The current provided to the drive transistor Q1 may be increased during the active mode to put the drive transistor Q1 deep in the active mode such that the collector-emitter voltage is maintained at a high voltage. The current supplied to the drive transistor Q1 may be increased until unsafe operating limits of the drive transistor Q1 are reached.

In FIG. 2B, the dimmer output voltage 110 is associated with a leading edge dimmer which is typically a TRIAC dimmer. When the dimmer switch 10 is turned-on, the leading edge of the dimmer output voltage 110 is eliminated by the dimmer switch 10 through phase angle switching. Conversely, when the dimmer switch 10 is turned-off, the dimmer output voltage 110 is unaffected by the dimmer switch 10.

As shown in FIG. 2B, the bleed current enable 203 is high 207 causing the power controller 30 to operate the drive transistor Q1 in the active mode when the dimmer switch 10 is off. Otherwise, the bypass capacitance (not shown) in the dimmer switch 10 would drift upward causing the phase measurement of the dimmer switch 10 to become distorted. In one embodiment, the phase measurement helps determine when the drive transistor Q1 is operated in the active mode relative to when the dimmer switch 10 is turned off. When the dimmer switch 10 turns on, the bleed current enable 203 goes low 205 shortly after a delay period 209 thereby turning off the drive transistor Q1. The bleed current enable 203 is reasserted to the high 207 state prior to the dimmer switch turning off.

In FIG. 2C, the dimmer output voltage 110 is associated with a trailing edge dimmer, which typically uses MOSFET switches instead of a TRIAC. In FIG. 2C, when the dimmer switch 10 is turned-on, the leading edge of the dimmer output voltage 110 is unaffected by the dimmer switch 10. Conversely, when the dimmer switch 10 is turned-off, the trailing edge of the dimmer output voltage 110 is eliminated by the dimmer switch 10.

As shown in FIG. 2C, the bleed current enable 203 is set high 207 just before the dimmer switch 10 transitions to the off state with minimum overlap 211 thereby causing the power controller 30 to operate the drive transistor Q1 in the active mode. The bleed current enable 203 is set low 205 thereby causing the power controller 30 to turn off the drive transistor Q1 as the dimmer switch 10 transitions back to the on state. In the trailing edge type dimmer, overlap 211 exists between when the dimmer switch 10 is turned off and when the bleed current enable 203 transitions high 207. The overlap is necessary to ensure that the power controller 30 can accurately determine the time at which the dimmer switch 10 turns off to determine the brightness setting of the LED. However, the overlap 211 is kept to a minimum to ensure efficiency and safety of operation of the power converter 120.

In one embodiment, the power controller 30 may become confused (i.e., lose track) of the phase of the dimmer switch 10 or the zero voltage crossing points of the dimmer output voltage 110. As a result, in both leading and trailing edge dimmer configurations, the drive transistor Q1 may be accidentally operated in the active mode for long periods of time where high voltage is applied across the drive transistor Q1.

As a result, the drive transistor Q1 dissipates power which may lead to the drive transistor Q1 reaching unsafe operating conditions that may cause the drive transistor Q1 to fail. In one embodiment, the power controller 30 determines when the drive transistor Q1 is operated in the active mode for too long and prevents the drive transistor Q1 from continuing to operate in the active mode.

Figure 3:
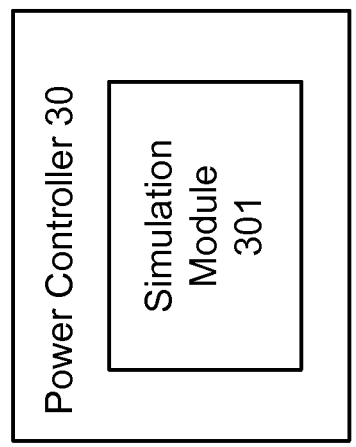
FIG. 3 illustrates a detailed view of a power controller according to one embodiment.

FIG. 3 illustrates a detailed view of the power controller 30. In one embodiment, the power controller 30 comprises a simulation module 301. The simulation module 301 may monitor the power dissipation across the drive transistor Q1 by predicting the power dissipation of the drive transistor Q1. The simulation module 301 predicts the power dissipation of the drive transistor Q1 based on the current that is programmed to flow through the drive transistor Q1 and a continuous observation of the voltage applied across the drive transistor Q1. Because the power controller 30 controls the current $I_B$ provided to the base of the drive transistor Q1 and the common-emitter current gain β of the drive transistor Q1 is known, the power controller 30 can determine the current through the drive transistor Q1.

In one embodiment, the simulation module 301 may generate a real-time simulation of the dissipated power of the drive transistor Q1. The simulation module 301 may also generate a simulation of the thermal resistance and capacitance of the drive transistor Q1. The simulation of the dissipated power, the thermal resistance, and the capacitance allows the simulation module 301 to estimate the heat flowing out of the drive transistor Q1.

By continuously observing the real-time numerical simulations of the drive transistor Q1, the simulation module 301 may determine if the drive transistor Q1 has been operated in the active mode for a period of time which would cause the drive transistor Q1 to operate at an unsafe temperature as a result of the dissipated power by the drive transistor Q1. When an energy threshold is met, the simulation module 301 may shut down the drive transistor Q1 to allow the drive transistor Q1 to cool to a safe operating temperature.

Figure 4:
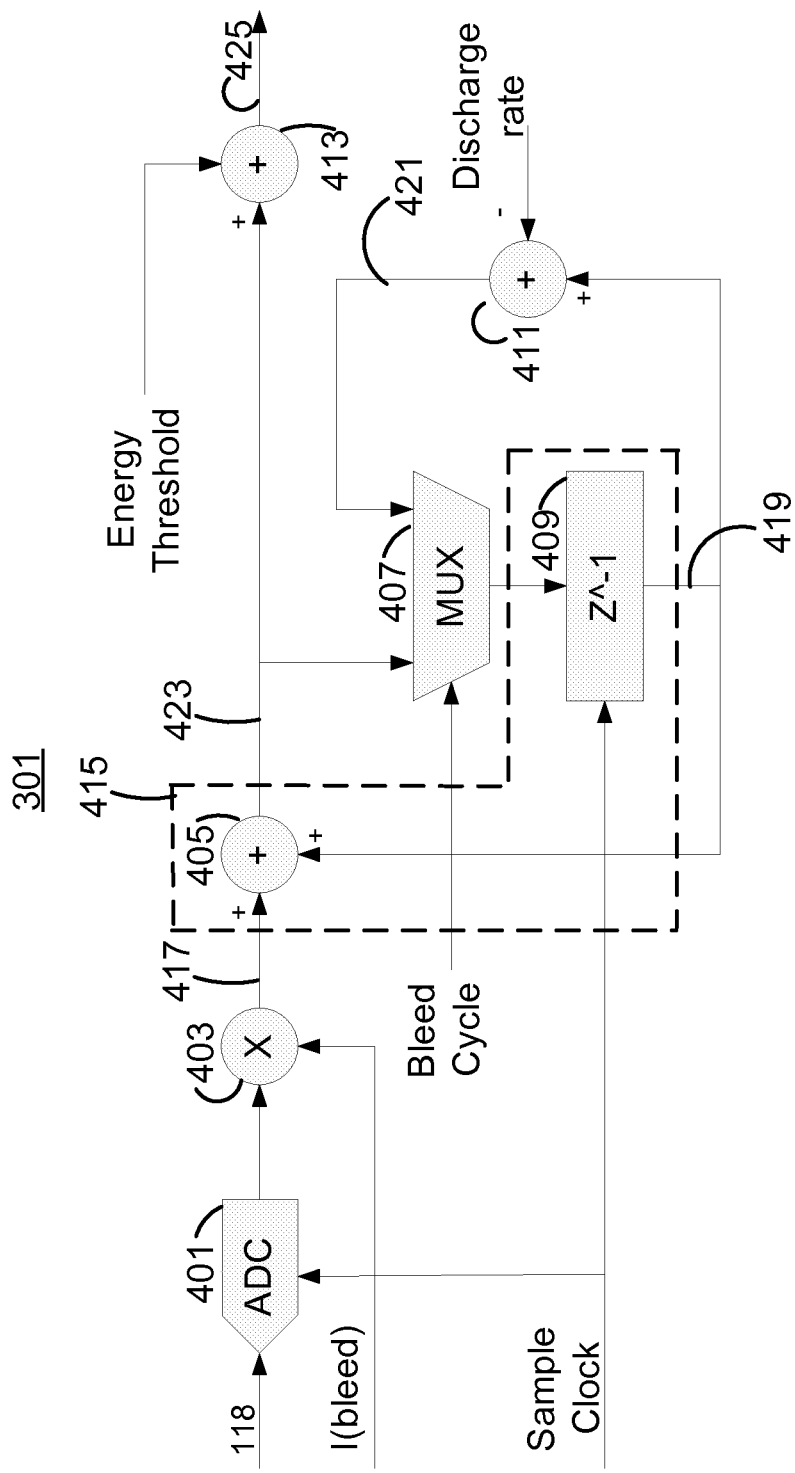
FIG. 4 illustrates a circuit diagram of a simulation module according to one embodiment.

FIG. 4 illustrates one embodiment of a circuit diagram of the simulation module 301. The simulation module 301 may comprise an analog-to-digital converter (ADC) 401, a multiplier 403, an adder 405, a multiplexer 407, a register 409, a subtractor 411, and a subtractor 413. Note that in other embodiments, the simulation module 301 may comprise other components other than those illustrated in FIG. 4.

In one embodiment, the input voltage 118 to the drive transistor Q1 is sampled by the ADC 401 at a sample rate sufficient to observe the shape of the rectified voltage 112 provided by the bridge rectifier BR1. The input voltage 118 to the drive transistor Q1 is equivalent to the rectified input voltage 112 because a voltage drop does not occur across the inductor L1 during the linear mode, since the power converter 120 is in the constant current mode. In one embodiment, only a limited number of bits are needed such as the most significant bits of the sample. The sampled voltage is scaled by a digital representation of the current through the drive transistor Q1 illustrated in FIG. 4 as I(bleed). The current is generally represented by a small integer number, since the actual current will be a fixed scale factor multiplied by the small integer number. In one embodiment, the sampled voltage is scaled by the current through the drive transistor Q1 using a multiplier 403.

The output 417 of the multiplier 403 represents the instantaneous power dissipated by the drive transistor Q1 since the multiplier 403 multiplies the input voltage 118 to the drive transistor Q1 and the current flowing through the drive transistor Q1 I(bleed). The instantaneous power dissipated by the drive transistor Q1 is inputted into an integrator 415. As is known, energy is the integral of power over time. The energy dissipated by the drive transistor Q1 is accumulated with the integrator 415.

As shown in FIG. 4, the integrator 415 comprises an adder 405 and a register 409. Generally, the integrator 415 simulates heat being generated by the drive transistor Q1 as the drive transistor Q1 dissipates power since magnitudes of various power dissipations are associated with an operating temperature of the drive transistor Q1. Thus, the output 419 of the integrator 415 represents the temperature of the drive transistor Q1 as a function of dissipated energy which is fed back into the adder 405.

The output 419 of the integrator 415 is also inputted into the subtractor 411. The subtractor 411 subtracts energy from the accumulated energy in the register 409. In one embodiment, the output 421 of the subtractor 411 represents the heat flow out of the drive transistor Q1. The subtractor 411 is periodically switched on by a multiplexor 407 based on the "bleed cycle" signal shown in FIG. 4. Based on the value of the bleed cycle signal, the multiplexor 407 controls whether the multiplexor 407 inputs the output 423 of the adder 405 (which represents accumulated energy of the drive transistor Q1) into the register 409 at the rising edge of the sample clock or whether the output 421 of the subtractor 411 is inputted into the register 409.

In one embodiment, the output 421 of the subtractor 411 discharges the integrator 415 at a rate determined by the discharge rate signal inputted into the subtractor 411. The subtractor 411 may be periodically turned on once per N cycles such that during normal operation of the drive transistor Q1, the subtractor 411 ensures that the accumulated energy in the integrator 415 does not rise indefinitely. Particularly, the subtractor 411 discharges the dissipated energy stored in the register 409 which is used to model the temperature of the drive transistor Q1. Thus, if the drive transistor Q1 is turned off (i.e., no current flows through the drive transistor Q1) for a period of time, the dissipated energy stored in the register 409 will eventually discharge to zero. In one embodiment, the discharge rate is set such that the energy stored in the register 409 does not increase during normal operation of the LED lamp 20. This is accomplished by setting the discharge rate so that it models the convection cooling of the drive transistor Q1 which is faster than the amount of heat that is accumulated in the drive transistor Q1 during operation in the active mode.

The output 423 of the adder 405 representing the energy dissipated by the drive transistor Q1 is inputted into a subtractor 413 where an accumulated energy threshold is subtracted from the energy dissipated by the drive transistor Q1. In one embodiment, the drive transistor Q1 is operated in the active mode for a plurality of cycles (e.g., 3 to 5 cycles) at the beginning of operation of the simulation module 301 to identify whether the dimmer switch 10 is a leading edge dimmer or a trailing edge dimmer. Generally, the plurality of cycles that the drive transistor Q1 is operated in during the active mode corresponds to the longest duration in which the drive transistor Q1 may be normally operated in the active mode (i.e., the worst case scenario). The energy threshold may correspond to an energy level set just above the amount of energy dissipated by the drive transistor Q1 during the plurality of cycles. Thus, if the LED lamp 20 becomes unsynchronized with the dimmer switch 10, the simulation module 301 may detect an unsafe operating condition with the plurality of cycles.

In one embodiment, if the output 425 of the subtractor 413 is a positive value, the simulation module 301 generates a signal that an unsafe operation is occurring in real time. As mentioned previously, the energy dissipated by the drive transistor Q1 indicates the temperature of the drive transistor Q1. Thus, the positive value signifies that the drive transistor Q1 is operating at an unsafe operating temperature because the drive transistor Q1 has dissipated too much energy since it has been in the active mode for a period of time greater than what should ever be expected during normal operation of the drive transistor Q1. The signal causes the simulation module 301 to turn off the drive transistor Q1 to allow the drive transistor to cool to a safe operating temperature.

In an alternative embodiment, the discharge path 411 may be omitted from the circuit diagram of the simulation module 301 shown in FIG. 4. In one embodiment, the input to the multiplexer 407 is replaced with a constant value used to reset the integrator 415 at predetermined time periods or a predetermined number of switching cycles. In one embodiment, the constant value may be zero. By replacing the discharge path 411 with the constant value, a threshold is used to determine the maximum allowable energy dissipation by the drive transistor Q1 over the predetermined time periods or the predetermined number of switching cycles.

Figure 5:
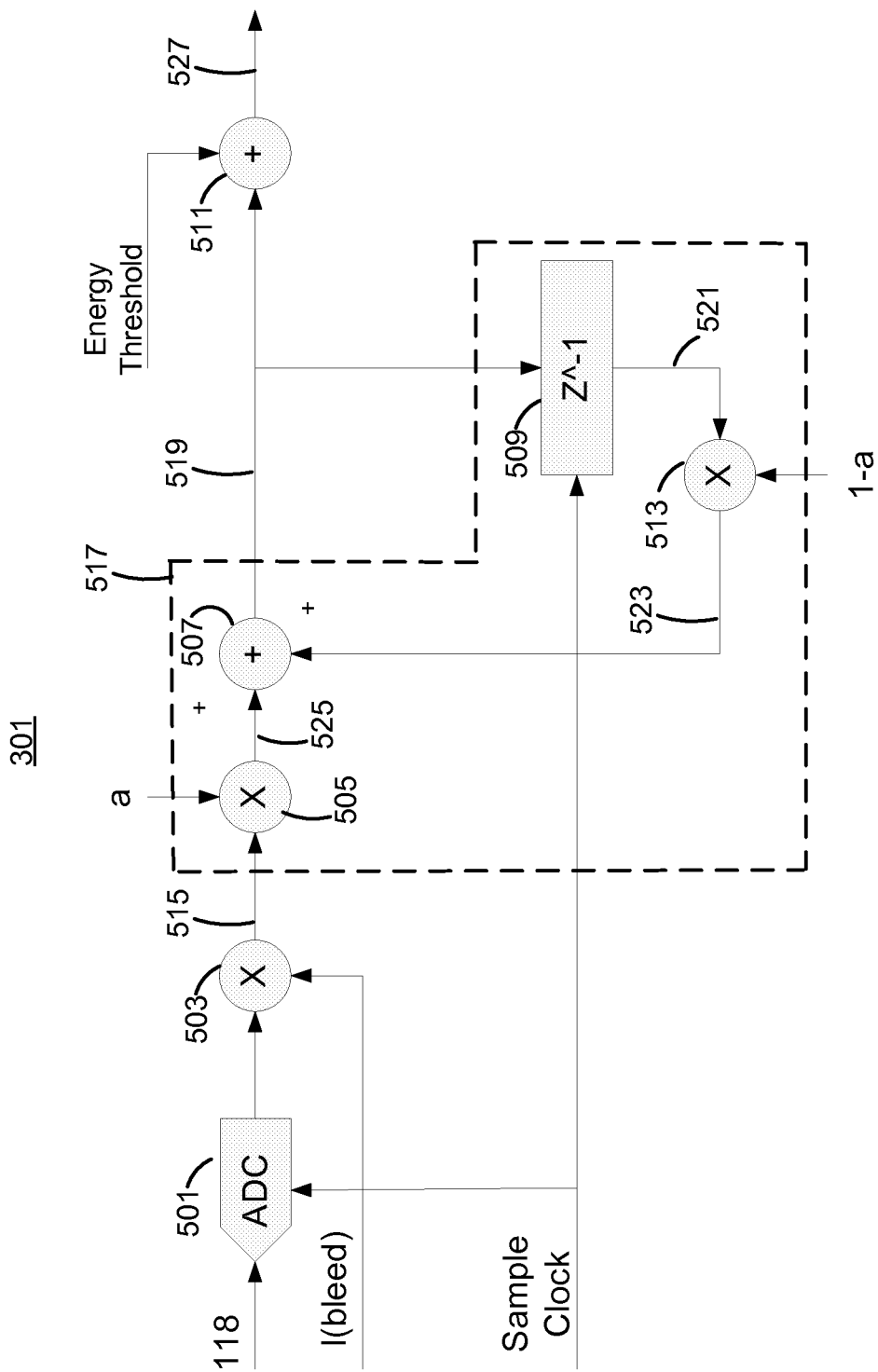
FIG. 5 illustrates an alternative circuit diagram of the simulation module according to one embodiment.

FIG. 5 illustrates an alternative embodiment circuit diagram of the simulation module 301. In one embodiment, the simulation module 301 comprises an ADC converter 501, a multiplier 503, a multiplier 505, and an adder 507, a register 509, a multiplier 513, and a subtractor 511. Generally, the embodiment of the simulation module 301 in FIG. 5 differs from the embodiment of the simulation module 301 in FIG. 4 in that FIG. 5 utilizes a low pass filter 517 (i.e., a leaky integrator) rather than the integrator 415 and subtractor 411 that operates as a discharger in FIG. 4. Note that in other embodiments, the simulation module 301 may comprise other components other than those illustrated in FIG. 5.

In one embodiment, the input voltage 118 to the drive transistor Q1 is sampled by the ADC 501 at a sample rate sufficient to observe the shape of the rectified voltage provided by the bridge rectifier BR1. Similar to FIG. 4, the sampled voltage is scaled by a digital representation of the current through the drive transistor Q11(bleed). In one embodiment, the multiplier 503 multiplies the sampled voltage by the current through the drive transistor Q (i.e., I(bleed)).

The output 515 of the multiplier 503 represents the instantaneous power dissipated by the drive transistor Q1. The power dissipated by the drive transistor Q1 (e.g., x(n)) is inputted into the low pass filter 517. In one embodiment, the low pass filter 517 comprises the multiplier 505, the adder 507, the delay register 509, and the multiplier 513. In one embodiment, a time constant is modeled to approximate the thermal time constant of the drive transistor Q1 which is a function of the thermal resistance $\theta_{ja}$ and the thermal capacitance of the drive transistor Q1. Thus, the low pass filter 517 models cooling of the drive transistor Q1 over time. The thermal resistance units are degree C. per watt and the thermal capacitance units are watt-seconds per degree C. (Joules/deg C). Therefore the thermal time constant is the product of the thermal resistance and thermal capacitance which results in units of time. The low pass filter models 517 this time constant.

If the thermal resistance and the thermal capacitance of the drive transistor are known, the simulation module 301 may determine a thermal time constant illustrating the duration of time it takes the operating temperature of the drive transistor Q1 to rise and fall as a result of different power dissipations. Generally, the low pass filter 517 is a first order infinite impulse response (IIR) arrangement associated with the following transfer function (1) and time constant τ (2):

$$y(n) = y(n-1) \cdot (1-a) + ax(n) \quad (1)$$

$$\tau = \frac{t}{-\ln(1-a)} \quad (2)$$

Using the time constant from equation 2, the simulation module 301 adjusts the values of a in the transfer function of equation 1 to have approximately the same time constant shown in equation 2. This allows the simulation module 301 to simulate the heat flow out of the drive transistor Q1 without the need for the discharger in the embodiment of FIG. 4.

As shown in FIG. 5, the multiplier 505 scales the instantaneous power dissipated by the drive transistor Q1 (e.g., x(n)) by a scaling factor "a" resulting in the output 525 of ax(n) which is inputted into the adder 507. The output 519 of the adder 507 (e.g., y(n)) representing dissipated energy of the drive transistor Q1 is inputted into the delay register 509 which delays the scaled instantaneous energy resulting in the output 521 (e.g., y(n−1)). The multiplier 513 multiplies the scaled instantaneous energy by a scaling factor of "1−a" resulting in the output 523 of "y(n−1)(1−a)". In one embodiment, the combination of the multiplier 513 and the delay register 509 models the thermal packaging of the drive transistor Q1. The adder 507 adds the output 523 of the multiplier 513 with the output of the multiplier 505 to create output 519 "y(n)" that represents the instantaneous heat energy contained in the drive transistor Q1, which is the dissipated energy minus the energy that flowed out of the package.

The output 519 of the adder 507 is inputted into the subtractor 511 where an accumulated energy threshold is subtracted from the energy dissipated by the drive transistor Q1. In one embodiment, if the output 527 of the subtractor 511 is a positive value, the simulation module 301 generates a signal that an unsafe operation is occurring in real time. The signal causes the simulation module 301 to turn off the drive transistor Q1 to allow the drive transistor to cool to a safe operating temperature.

In the disclosure above, a digital implementation is used to monitor the power dissipation across the drive transistor Q1. In alternative embodiments, equivalent analog circuits (e.g., filters and integrators) or a combination of analog circuits and the digital implementation may be used to monitor the power dissipation across the drive transistor Q1.

Figure 6:
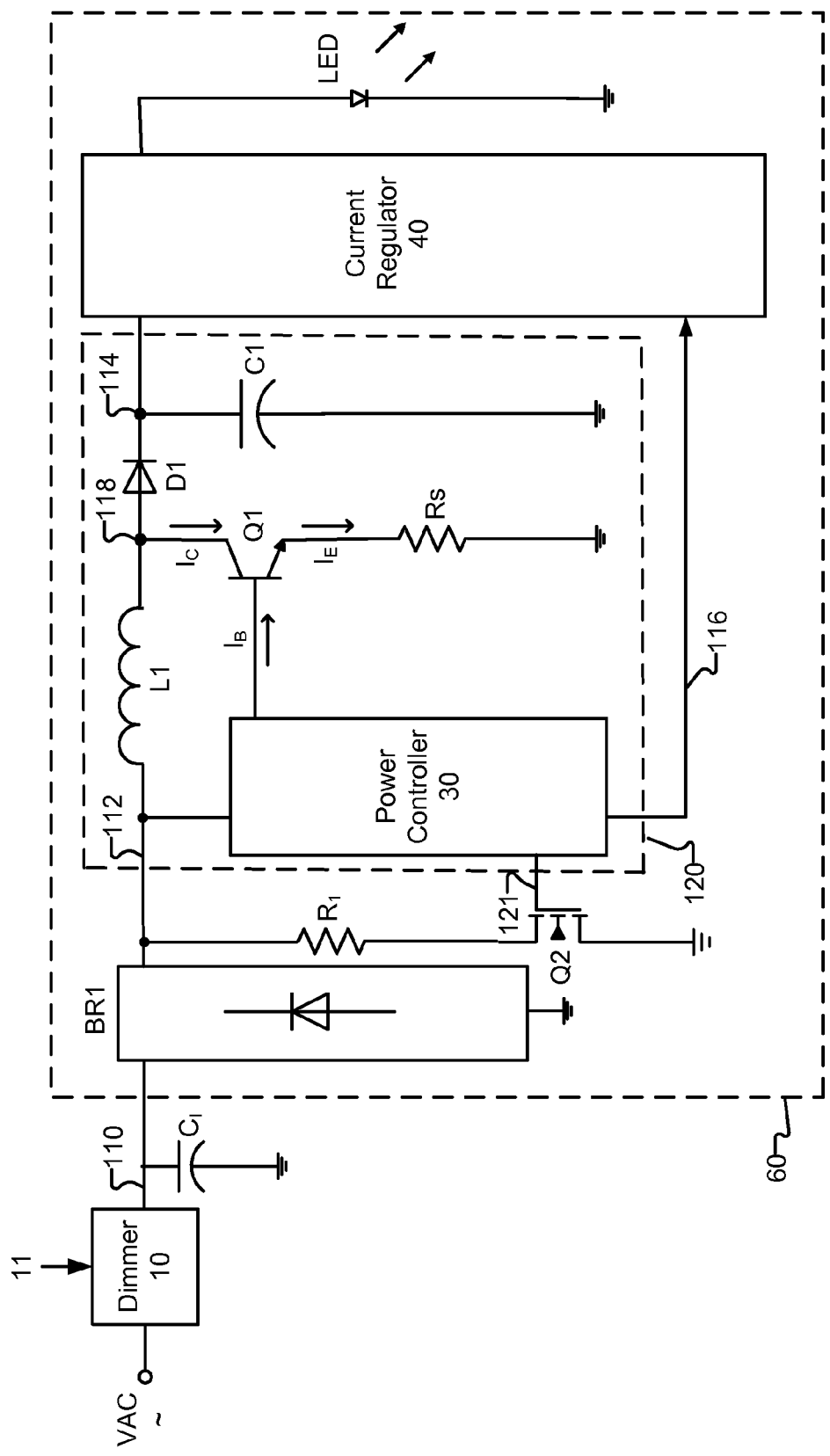
FIG. 6 illustrates an alternative LED lamp system according to one embodiment.

FIG. 6 illustrates a LED lamp system including the dimmer switch 10 and a LED lamp 60. The LED lamp system of FIG. 6 includes similar components as the LED lamp system shown in FIG. 1. The components of the LED lamp system shown in FIG. 6 perform similar functionality to their counterparts in the LED lamp system of FIG. 1 unless otherwise specified.

In contrast to the LED lamp 20 of FIG. 1, the LED lamp 60 includes a bleeder transistor Q2 coupled to the rectified input voltage 112 via resistor $R_1$. In one embodiment, the bleeder transistor Q2 is a MOSFET. However, other switching devices such as a BJT may be used in other embodiments.

In the LED lamp 60, the power controller 30 controls the bleeder transistor Q2 to turn on to draw current from the dimmer switch 11 thereby allowing the internal circuitry of the dimmer switch 11 to function properly. The power controller 30 may operate the bleeder transistor Q2 as a switching load, a constant current load, or a switched resistive load depending on the magnitude of the drive signal 121 applied by the power controller 30 to the base of the bleeder transistor Q2.

Since the bleeder transistor Q2 draws current from the dimmer switch 11, the drive transistor Q1 does not function as a current sink for the power converter 120 as previously described with respect to the embodiment of FIG. 1. The drive transistor Q1 of the embodiment shown in FIG. 6 operates merely as a switching device to deliver power to the output of the power converter 120.

In one embodiment, the power controller 30 controls the bleeder transistor Q2 to turn on to draw current from the dimmer switch 11 based on the bleed current enable signal 203 described with respect to FIGS. 2B and 2C. The bleed current enable signal 203 cycles between an on state 207 and an off state 205 that signifies when the power controller 30 turns on the bleeder transistor Q2 to draw current from the dimmer switch 11.

While the bleed transistor Q2 is turned on, the power controller 30 monitors the power dissipation across the bleeder transistor Q2 by predicting the power dissipation of the bleeder transistor Q2 as previously described above with respect to FIGS. 3 through 5. When an unsafe operating condition is determined by the power controller 30 based on the predicted power dissipation of the bleeder transistor Q2, the power controller 30 may turn off the bleeder transistor Q2.

Upon reading this disclosure, those of skill in the art will appreciate still additional alternative designs for controlling the operation modes of power converters. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A light emitting diode (LED) lamp comprising:
   a switching power converter including:
      a magnetic component coupled to an output voltage of a dimmer switch with phase angle switching and coupled to an output of the switching power converter, the output voltage of the dimmer switch received as the input voltage of the switching power converter;
      a switch coupled to the magnetic component, current through the magnetic component being generated while the switch is turned on and not being generated while the switch is turned off; and
      a controller configured to generate a control signal to turn on or turn off the switch at each switching cycle of the switch;
         wherein the controller is configured to operate the switch in a first mode to deliver electrical power to the output of the switching power converter or operate the switch in a second mode causing the switch to function as a current sink;
         wherein the controller is configured to estimate power dissipated by the switch during the second mode to determine whether the switch is approaching an unsafe operating condition;
   a current regulator coupled to the output of the switching power converter, the current regulator receiving the electrical power delivered by the switching power converter; and
   one or more LEDs coupled to an output of the current regulator;

wherein the current regulator regulates current through the one or more LEDs based on a control signal from the controller.

2. The LED lamp of claim 1, wherein the switch is a bipolar-junction transistor.

3. The LED lamp of claim 2, wherein during the first mode the controller is configured to continuously switch operation of the switch between a saturation mode and a cutoff mode of the bipolar junction transistor.

4. The LED lamp of claim 2, wherein during the second mode the controller is configured to operate the switch in an active mode of the bipolar junction transistor to cause the switch to function as the current sink of the switching power converter.

5. The switching power converter of claim 1, wherein the switch is a metal-oxide-semiconductor field-effect transistor.

6. The switching power converter of claim 1, wherein the controller is further configured to turn off the switch responsive to the estimated power dissipated by the switch exceeding a threshold that is indicative that the switch is approaching the unsafe operating condition.

7. The switching power converter of claim 1, wherein the switch functions as the current sink to draw current from the dimmer switch coupled to the switching power converter to cause the dimmer switch to correctly adjust the input voltage of the switching power converter.

8. The switching power converter of claim 1, wherein the controller includes:
 an analog-to-digital converter (ADC) to sample the input voltage;
 a multiplier coupled to the ADC to receive the sampled input voltage and calculate the power dissipated by the switch during the second mode based on the sampled input voltage and current through the switch;
 an integrator coupled to the multiplier to receive the power dissipated by the switch and simulate energy dissipated by the switch during the second mode based on the power dissipated by the switch; and
 a subtractor to compare the energy dissipated by the switch to a threshold to determine whether the switch is approaching the unsafe operating condition.

9. The switching power converter of claim 1, wherein the controller further includes:
 a second subtractor that removes energy representing heat flow out of the switch from the energy simulated by the integrator.

10. The switching power converter of claim 1, wherein the controller includes:
 an analog-to-digital converter (ADC) to sample the input voltage;
 a multiplier coupled to the ADC to receive the sampled input voltage and calculate the power dissipated by the switch during the second mode based on the sampled input voltage and current through the switch;
 a low pass filter coupled to the multiplier to receive the power dissipated by the switch from the multiplier and simulate energy dissipated by the switch during the second mode based on the power dissipated by the switch and cooling of the switch over time;
 a subtractor coupled to the low pass filter to compare the energy dissipated by the switch to a threshold to determine whether the switch is approaching the unsafe operating condition.

11. The switching power converter of claim 10, wherein the low pass filter includes:
 a second multiplier to calculate energy dissipated by the switch after cooling of the switch over time;
 a delay register to receive the energy dissipated by the switch and to delay the energy dissipated by the switch; and
 a third multiplier coupled to the delay register to calculate a scaled representation of the energy dissipated by the switch based on the cooling of the switch over time.

12. In a controller, a method of controlling a light emitting diode (LED) lamp, the LED lamp comprising a switching power converter including a magnetic component coupled to an output voltage of a dimmer switch with phase angle switching and coupled to an output of the switching power converter, the output voltage of the dimmer switch received as the input voltage of the switching power converter, and a switch coupled to the magnetic component, current through the magnetic component being generated while the switch is turned on and not being generated while the switch is turned off, the LED lamp further including a current regulator coupled to the output of the switching power converter, the current regulator receiving the electrical power delivered by the switching power converter, and one or more LEDs coupled to an output of the current regulator, the method comprising:
 generating a control signal to turn on or turn off the switch at each switching cycle of the switch;
 operating the switch either in a first mode to deliver electrical power to the output of the switching power converter or operating the switch in a second mode causing the switch to function as a current sink; and
 estimating power dissipated by the switch during the second mode to determine whether the switch is approaching an unsafe operating condition.

13. The method of claim 12, wherein the switch is a bipolar-junction transistor.

14. The method of claim 13, further comprising:
 continuously switching operation of the switch between a saturation mode and a cutoff mode of the bipolar-junction transistor during the first mode.

15. The method of claim 13, further comprising:
 operating the switch in an active mode of the bipolar junction transistor to cause the switch to function as the current sink of the switching power converter.

16. The method of claim 12, wherein the switch is a metal-oxide-semiconductor field-effect transistor.

17. The method of claim 12, further comprising:
 turning off the switch responsive to the estimated power dissipated by the switch exceeding a threshold that is indicative that the switch is approaching the unsafe operating condition.

18. The method of claim 12, wherein estimating the power dissipated by the switch comprises:
 sampling the input voltage;
 calculating the power dissipated by the switch during the second mode based on the sampled input voltage and current through the switch;
 simulating energy dissipated by the switch during the second mode based on the power dissipated by the switch;
 comparing the energy dissipated by the switch to a threshold to determine whether the switch is approaching the unsafe operating condition.

19. The method of claim 13, wherein the switch functions as the current sink to draw current from the dimmer switch coupled to the switching power converter to cause the dimmer switch to correctly adjust the input voltage of the switching power converter.

20. A light emitting diode (LED) lamp comprising:
a first switch coupled to an output voltage of a dimmer switch with phase angle switching, the output voltage of the dimmer switch received as an input voltage of the LED lamp;
a switching power converter including:
   a magnetic component coupled to the input voltage of the LED lamp and coupled to an output of the switching power converter;
   a second switch coupled to the magnetic component, current through the magnetic component being generated while the second switch is turned on and not being generated while the second switch is turned off; and
   a controller configured to generate a control signal to turn on or turn off the second switch at each switching cycle of the second switch;
   wherein the controller is configured to turn on the first switch to draw current from the dimmer switch;
   wherein the controller is configured to estimate power dissipated by the first switch when the first switch is turned on; and
   wherein the controller is configured to determine whether the first switch is approaching an unsafe operating condition based on the estimated power dissipated by the first switch;
a current regulator coupled to the output of the switching power converter, the current regulator receiving the electrical power delivered by the switching power converter; and
one or more LEDs coupled to an output of the current regulator;
wherein the current regulator regulates current through the one or more LEDs based on a control signal from the controller.

* * * * *

UNITED STATES PATENT AND TRADEMARK OFFICE
CERTIFICATE OF CORRECTION

PATENT NO. : 8,823,283 B2  
APPLICATION NO. : 13/738374  
DATED : September 2, 2014  
INVENTOR(S) : John William Kesterson et al.

Page 1 of 1

It is certified that error appears in the above-identified patent and that said Letters Patent is hereby corrected as shown below:

In the Claims

Column 11, line 12, Claim 4, after "bipolar," insert -- - --.

Column 12, line 41, Claim 15, after "bipolar," insert -- - --.

Signed and Sealed this  
First Day of September, 2015

Michelle K. Lee  
*Director of the United States Patent and Trademark Office*